(12) United States Patent
KalTsounis et al.

(10) Patent No.: US 6,675,657 B1
(45) Date of Patent: Jan. 13, 2004

(54) SELF-DAMPENING VESSEL

(75) Inventors: Nicholas O. KalTsounis, Rochester Hills, MI (US); Mathew Darrah, Royal Oak, MI (US); Michael O'Rourke, Rochester Hills, MI (US); Mary Cortese, Troy, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/280,605

(22) Filed: Oct. 25, 2002

(51) Int. Cl.$^7$ .............................. G01L 2/02; G01L 7/10
(52) U.S. Cl. ......................................................... 73/730
(58) Field of Search ..................... 73/730; 137/87.03, 137/87.04, 833; 417/312, 366, 540, 543

(56) References Cited

U.S. PATENT DOCUMENTS

| | | |
|---|---|---|
| 273,379 A | 3/1883 | Miller |
| 1,958,009 A | 5/1934 | McKee |
| 2,156,296 A | 5/1939 | Kline |
| 3,556,159 A * | 1/1971 | Bleasdale ..................... 138/30 |
| 4,628,994 A * | 12/1986 | Towner et al. ................. 166/68 |
| 4,831,885 A | 5/1989 | Dahlin |
| 4,928,719 A | 5/1990 | Inukai et al. |
| 5,111,848 A | 5/1992 | Inukai |
| 5,562,429 A | 10/1996 | Romstad et al. |
| 5,746,255 A | 5/1998 | Walsh et al. |

FOREIGN PATENT DOCUMENTS

| | | |
|---|---|---|
| EP | 0284570 | 3/1988 |
| JP | 10009449 | 1/1998 |
| JP | 10009453 | 1/1998 |
| JP | 11206904 | 8/1999 |
| JP | 11210944 | 8/1999 |
| JP | 11280961 | 10/1999 |

* cited by examiner

*Primary Examiner*—William Oen
(74) *Attorney, Agent, or Firm*—Rader, Fishman & Grauer PLLC

(57) ABSTRACT

A self-dampening vessel is disclosed for use with any fluid system. The vessel receives a fluid and encounters pressure pulsations, flow distribution problems, noises and/or vibrations from changes in the fluid pressure. To combat these undesired effects without the use of a separate damper, the vessel comprises a tubular member having opposing sides and opposing ends. The sides of the tubular member may vary in shape, but the sides are typically connected by rounded ends. When subjected to pressure changes, the tubular member adapts and expands or retracts from a neutral position. Furthermore, the ends of the tubular member may include an opening with an endcap attached to cover the opening. The endcap includes a port for mating the vessel to a fluid source. Alternative, the ends may be sealed and an outer surface of the tubular member may include the port integrally.

24 Claims, 4 Drawing Sheets

SELF-DAMPENING VESSEL

TECHNICAL FIELD

The present invention relates to a vessel for encapsulating a fluid and in particular to a vessel that is self-dampening by adjusting to pressure variations of the fluid by expanding or retracting from a neutral position.

BACKGROUND OF THE INVENTION

Various types of fluid vessels are typically utilized in automotive applications. One such application is with regard to fuel injector tubing typically having a round cross-section. The tubing encapsulates fuel and transfers the fuel from the fuel tank to the fuel injector. The fuel injector includes a valve that controls the flow of fuel from the tubing to the cylinder or air intake manifold. Repetitive closure of the valve generates pressure waves that resonate through the tubing causing pressure pulsations and undesirable noises, vibrations and harshness (NVH) in the tubing. The pressure waves resonate back through the fuel lines and generate a buzzing noise when contacting other portions of the engine chassis.

To reduce the effects of the pressure waves and changes, dampers are routinely implemented integrally into the tubing. The damper is typically a gas-filled member or an external spring-loaded diaphragm encapsulated by the fuel injector tubing to help balance the effects of the pressure waves and prevent NVH and pressure pulsations in the tubing. Although the use of an independent damper implemented integrally into the fuel injector tubing combats the effects of pressure changes relatively well, manufacturers today are looking for easier and more cost effective ways to solve the problems of NVH and pressure pulsations. Furthermore, these same problems occur in a variety of automotive and non-automotive applications. For automotive applications, some specific examples requiring the use of a damper include vessels for encapsulating transmission fluid, oil, power steering fluid, brake fluid, engine coolant, air and exhaust gases.

SUMMARY OF THE INVENTION

The inventors of the present invention have recognized various problems associated with vessels for encapsulating fluids. To this end, the inventors have developed a self-dampening vessel that eliminates an independent damper.

Specifically, the invention is a self-dampening vessel for encapsulating a fluid comprising a tubular member having opposing sides and opposing ends. The opposing sides are made of an elastic material that is capable of expanding radially outwardly from a neutral position to an expanded position or retracting radially inwardly from the neutral position to a retracted position in response to pressure changes of the fluid within the vessel.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
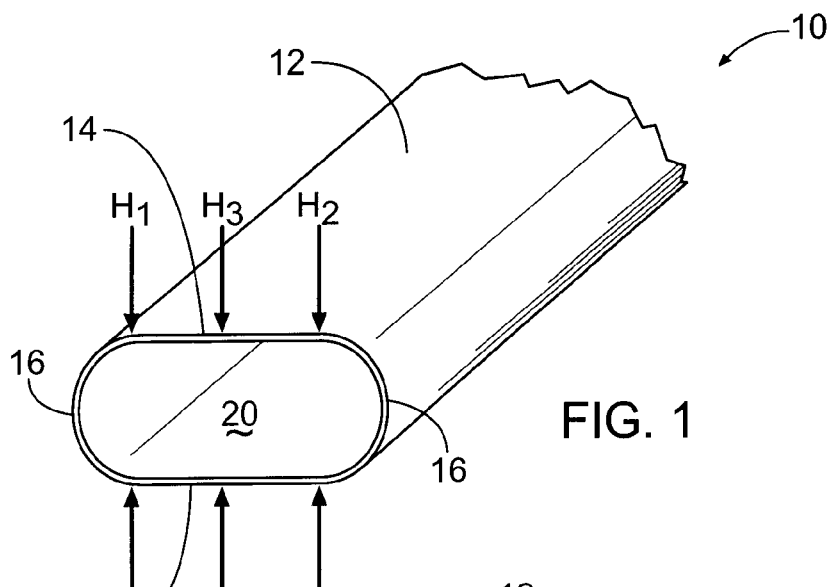
FIG. 1 is a perspective view of the invention in a neutral position.
Figure 7:
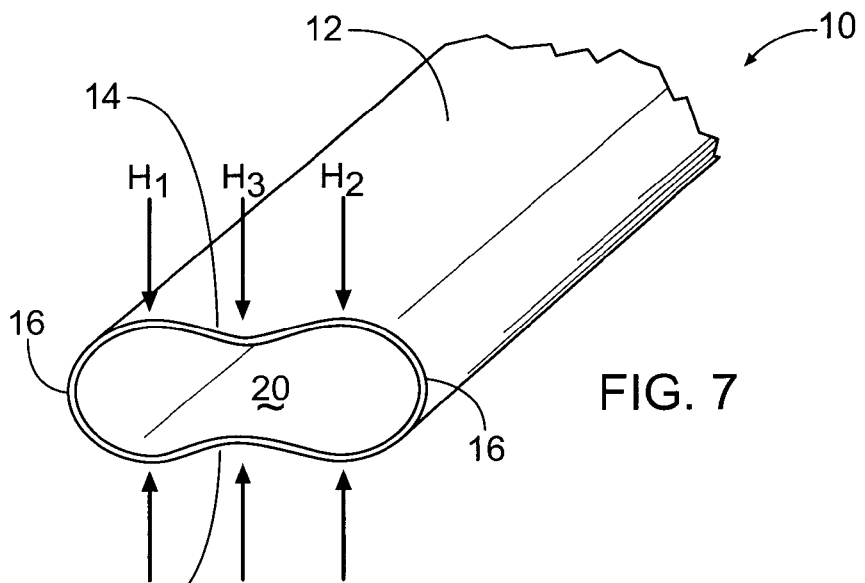
FIG. 7 is a perspective view of a second embodiment of the invention in the neutral position.

Referring to the drawings, a self-dampening vessel is generally shown at 10 for encapsulating a fluid such as fuel. Vessel 10 includes a tubular member 12 having two opposing sides 14 and two opposing ends 16. As noted in the figures, adjacent to each opposing end 16 is a first height, H1 and a second height, H2. A third height, H3, is generally spaced between each opposing end 16 and generally near the center of tubular member 12. As best seen in FIG. 1, a first embodiment of the present invention includes generally flattened sides 14 and in a neutral position third height, H3, is generally equal to first height, H1, and second height, H2. Alternatively, a second embodiment, as best seen in FIG. 7, has generally concave sides 14 and third height, H3, is less than first height, H1, and second height, H2, in the neutral position. The embodiments illustrated include first height, H1, generally equal to second height, H2. However, first height, H1, and second height, H2, may be dissimilar. Vessel 10 is functional and self-dampening regardless of the values of first height, H1, and second height, H2.

Sides 14 and ends 16 of tubular member 12 are made from an elastic material capable of flexing radially outward and inward regardless of the wall thickness of tubular member 12. Such elastic materials include plastic, rubber, aluminum, stainless steel or any other elastic metals. Changes in pressure of the fluid encapsulated by vessel 10 and the creation of pressure waves traditionally results in pressure pulsations, noises, flow distribution problems and/or vibrations. Instead of incorporating a separate damper, vessel 10 is self-dampening and adjusts itself in response to pressure changes.

Figure 2:
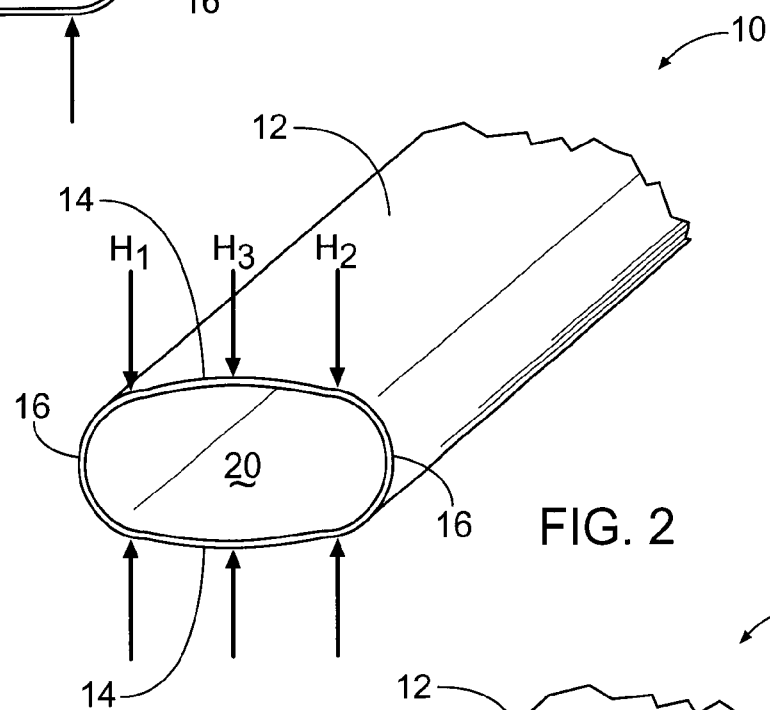
FIG. 2 is a perspective view of the invention in an expanded position.
Figure 3:
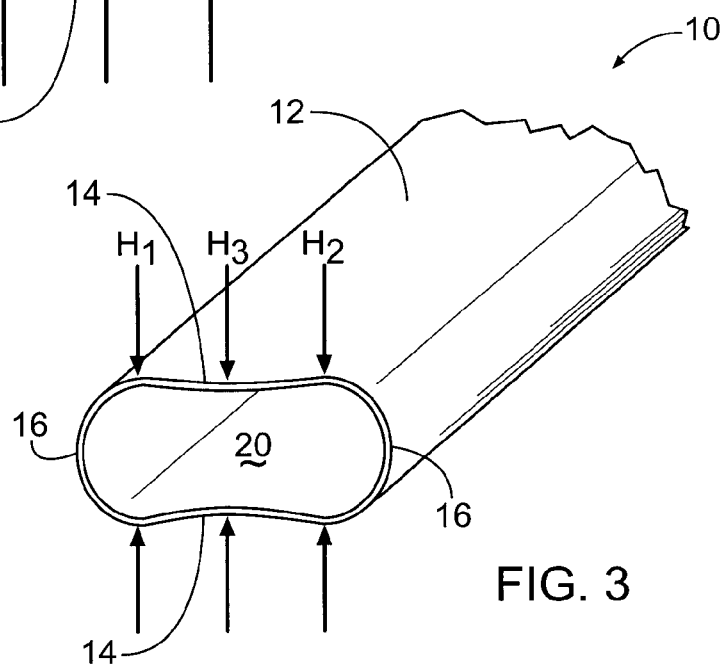
FIG. 3 is a perspective view of the invention in a retracted position.
Figure 4:
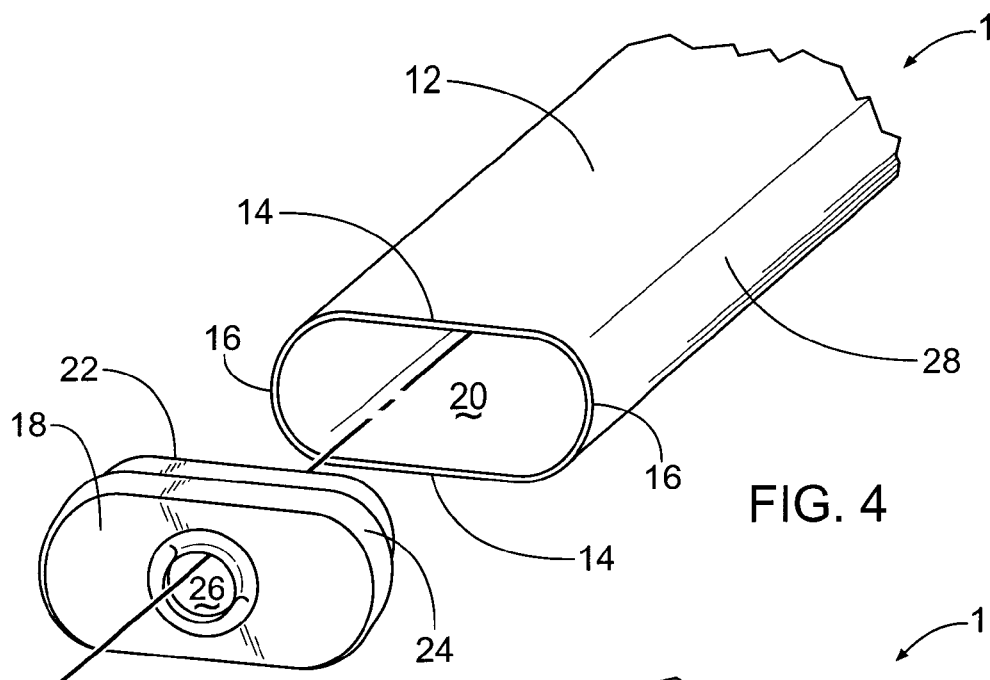
FIG. 4 is an exploded view of the invention having a cap.
Figure 5:
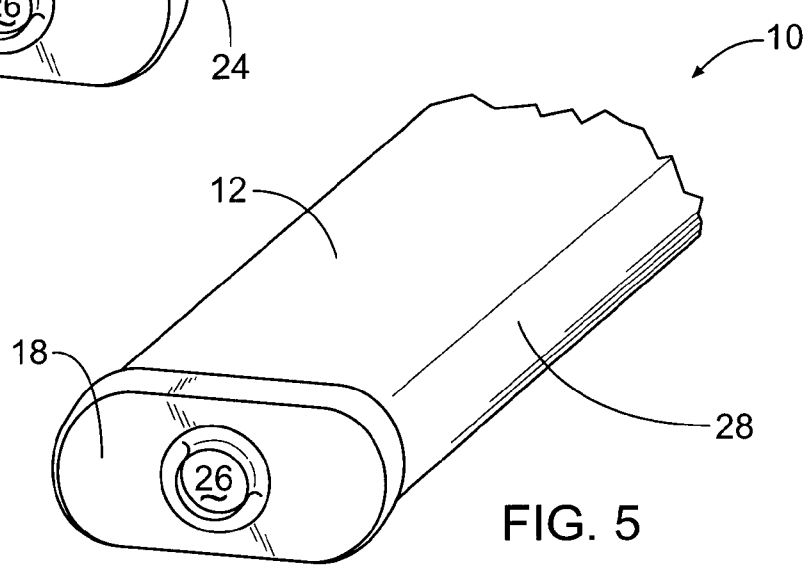
FIG. 5 is a perspective view of the invention assembled with the cap.

As shown in FIGS. 2–3, in the first embodiment flattened sides 14 expand and retract while ends 16 remain generally constant. Specifically, in FIG. 2, sides 14 expand radially outwardly to an expanded position causing third height, H3, to become greater than either first height, H1, or second height, H2. While ends 16 generally remain constant, minor expansion may occur. The expansion of ends 16, however, is not a significant amount of expansion and first height, H1, and second height, H2, would remain generally the same as when vessel 10 is in the neutral position. Additionally, flattened sides 14 may respond to the pressure waves by retracting radially inwardly to a retracted position, as best seen in FIG. 3. Accordingly, third height, H3, becomes less than at least first height, H1, or second height, H2, when vessel 10 is in the retracted position. Again, the ends remain generally constant, but may experience a minor amount of retraction.

A further embodiment (not shown) also within the scope of the present invention includes both sides 14 and ends 16 expanding and retracting. Accordingly, third height, H3, would remain generally equal to first height, H1, and second height, H2, when in the resulting expanded or retracted positions.

Figure 8:
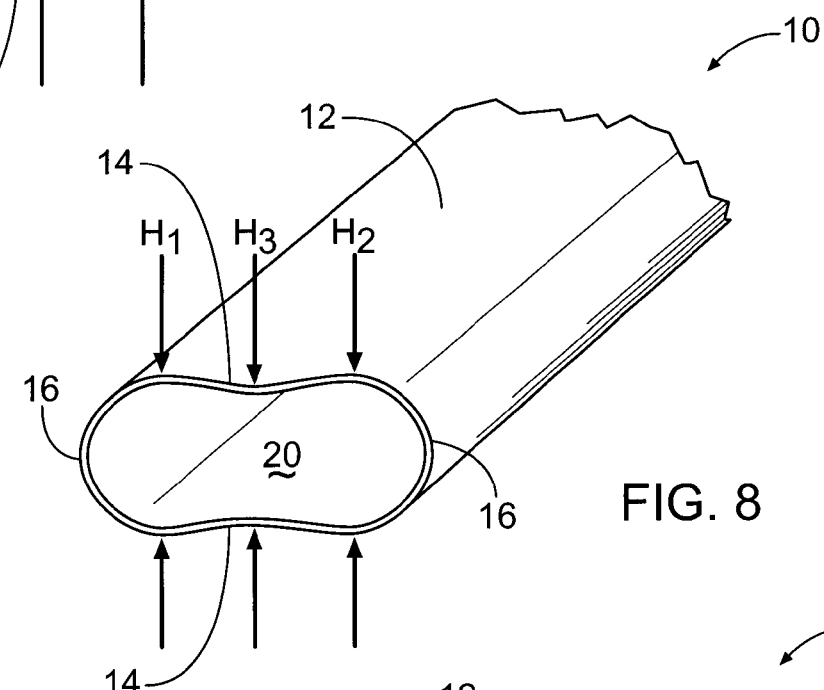
FIG. 8 is a perspective view of the second embodiment of the invention in the expanded position.
Figure 9:
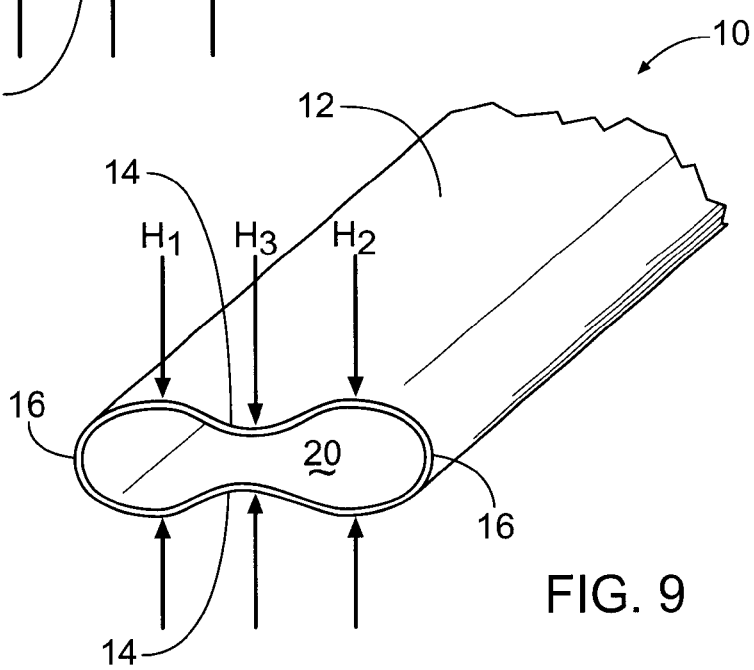
FIG. 9 is a perspective view of the second embodiment of the invention in the retracted position.
Figure 10:
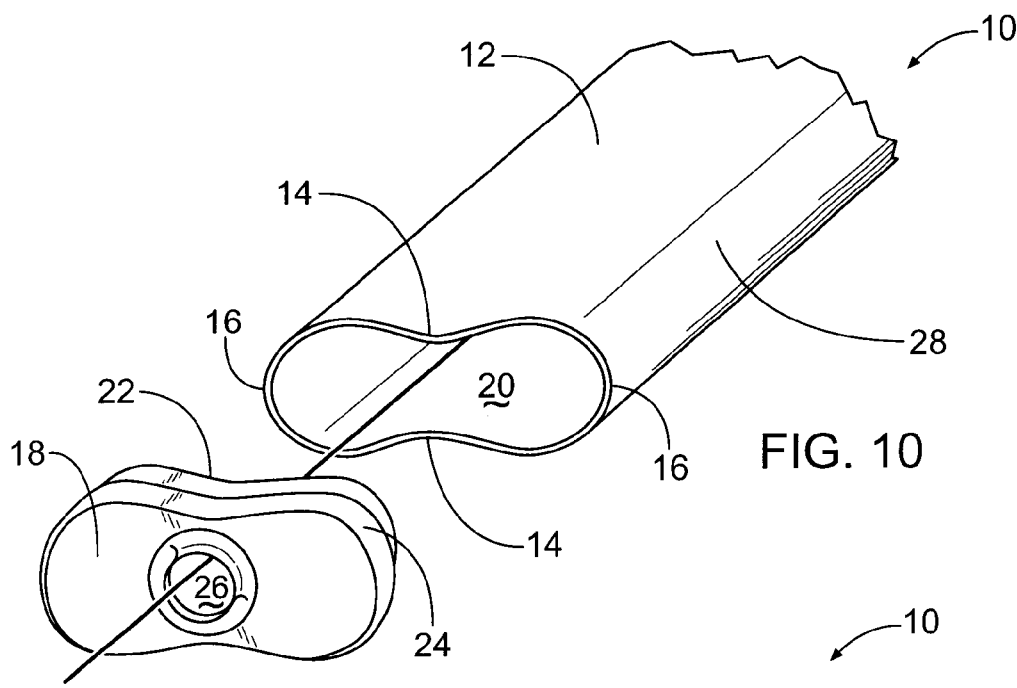
FIG. 10 is an exploded view of the second embodiment of the invention having a cap.
Figure 11:
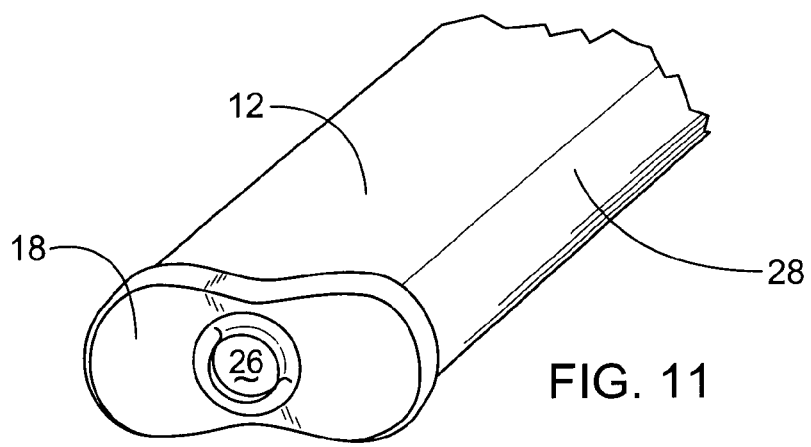
FIG. 11 is a perspective view of the second embodiment of the invention assembled with the cap.

As shown in FIGS. 8–9, in the second embodiment concave sides 14 and ends 16 expand and retract. Specifically, in FIG. 8, sides 14 and ends 16 expand radially outwardly to an expanded position, however, the third height, H3, remains less than the first height, H1, and second height, H2. Additionally, sides 14 and ends 16 may respond to the pressure waves by retracting radially inwardly to a retraced position as best seen in FIG. 9. Again, the third height, H3, remains less than the first height, H1, and second height, H2, when vessel 10 is in the retracted position. Throughout any expansion or retraction of vessel 10, tubular member 12 maintains its original shape with two ends 16 connected by concave sides 14 and having third height, H3, less than first height, H1, and second height, H2.

The expansion or retraction of sides 14 and change in shape of tubular member 12 absorbs internal pressure changes of the encapsulated fluid to combat the negative effects of pressure changes within vessel 10. To further improve the self-dampening feature of the present invention, vessel 10 may be manufactured with a variety of heights, widths and wall thicknesses to accommodate specific package or pulsation requirements.

Ends 16 of tubular member 12 are generally rounded and allow for a structurally improved and easier to manufacture vessel 10. Rounded ends 16 allow for less fatigue in tubular member 12 when flexed inward or outward. Traditional vessels (not shown) are rectangular in cross-section with a high stress concentration at the corners. Rounded ends 16 reduce the stress concentration and preserve the structure of vessel 10 during the repetitive changes in shape of tubular member 12. Furthermore, rounded ends 16 aid manufacturing by easily adapting to a variety of manufacturing techniques for attaching accessories to vessel 10. Such techniques include brazing, welding, piercing and forming, and allow use of saddle-type joints.

One such accessory attached to vessel 10 is a cap 18 as best seen in FIGS. 4, 5, 10 and 11. Tubular member 12 includes an opening 20 at each end. Opening 20 extends through tubular member 12 and receives the fluid such as fuel. Fixedly attached to tubular member 12 is cap 18 to cover opening 20. Cap 18 is shaped to coincide with the shape of tubular member 12. As shown, cap 18 may include a plug 22 that is received in opening 20 and a lip 24 that surrounds an outer surface 28 of tubular member 20. However, any technique for locating and attaching cap 18 to tubular member is also acceptable. Furthermore, vessel 10 may include openings 20 and caps 18 at both ends or, alternatively, only at one end of tubular member 12. In accordance with the present invention any alternative style of cap 18 would also be acceptable, including inner diameter or laser-weld style caps, and spin-weld closure of the tube.

Cap 18 further includes a port 26 extending though to opening 20 of tubular member 12. Port 26 may be of any shape or design to accommodate a specific application and mate properly to a fluid source. Port 26 permits the transfer of fluid in and out of tubular member 12.

Figure 6:
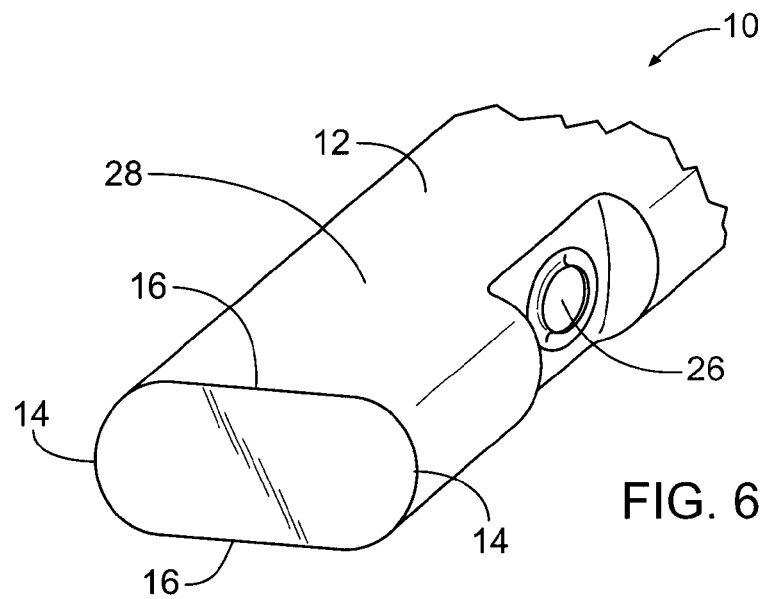
FIG. 6 is a perspective view of the invention including a port on the outer surface.
Figure 12:
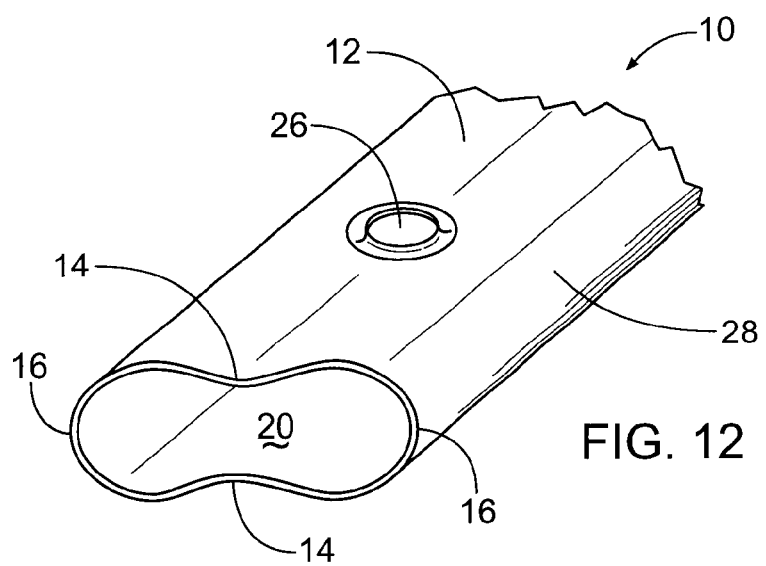
FIG. 12 is a perspective view of the second embodiment of the invention including a port on the outer surface.

An alternative to, or in addition to, the use of caps 18 is the use of an integral port 26 on outer surface 28 of tubular member 12. To accommodate a specific application and permit vessel 10 to receive fluid, port 26 is integral with outer surface 28. This alternative embodiment is best seen in FIGS. 6 and 12. As with cap 18, vessel 10 may include integral ports 26 at both ends or, alternatively, only at one end of tubular member 12. A further embodiment includes opening 20 and cap 18 at one end of tubular member 12 while integral port 26 is at the opposite end of tubular member 12. Finally, port 26, as shown in the figures, may also be located anywhere along tubular member 12.

It should be understood that the aforementioned and other various alternatives to the embodiments of the invention described herein, including combinations of the embodiments herein, may be employed in practicing the invention. It is intended that the following claims define the scope of the invention and that the method and apparatus within the scope of these claims and their equivalents be covered thereby.

What is claimed is:

1. A self-dampening vessel for encapsulating a fluid comprising:
   a tubular member having opposing sides and opposing ends; and
   at least said opposing sides being an elastic material capable of expanding radially outwardly from a neutral position to an expanded position or retracting radially inwardly from said neutral position to a retracted position in response to pressure changes of the fluid within the vessel.

2. A vessel, as in claim 1, wherein said tubular member includes a first height and a second height adjacent each of said opposing ends and a third height generally spaced between each of said opposing ends.

3. A vessel, as in claim 2, wherein said first height and said second height are generally equal.

4. A vessel, as in claim 2, wherein said first height and said second height are generally dissimilar.

5. A vessel, as in claim 3, wherein said third height is generally equal to said first height and said second height in said neutral position.

6. A vessel, as in claim 2, wherein said first height and said second height are generally constant and said third height is adjustable.

7. A vessel, as in claim 2, wherein said third height is greater than at least said first height or said second height when said opposing sides are expanded radially outwardly from said neutral position to said expanded position.

8. A vessel, as in claim 2, wherein said third height is less than at least said first height or said second height when said opposing sides are retracted radially inwardly from said neutral position to said retracted position.

9. A vessel, as in claim 2, wherein said first height, said second height and said third height are adjustable.

10. A vessel, as in claim 2, wherein said third height is less than said first height and said second height.

11. A vessel, as in claim 10, wherein said first height, said second height and said third height increase when said opposing sides are expanded radially outwardly from said neutral position to said expanded position and said third height remains less than said first height and said second height when in said expanded position.

12. A vessel, as in claim 10, wherein said first height, said second height and said third height reduce when said opposing sides are retracted radially inwardly from said neutral position to said retracted position and said third height remains less than said first height and said second height when in said retracted position.

13. A vessel, as in claim 1, wherein said opposing ends are generally rounded and are made from an elastic material.

14. A vessel, as in claim 1, wherein said tubular member further includes at least one opening and at least one cap fixedly attached to said tubular member and covering said at least one opening.

15. A vessel, as in claim 14, wherein said at least one cap includes a port for transferring fluids to and from said tubular member.

16. A vessel, as in claim 1, wherein said tubular member further includes an outer surface having a port for transferring fluids to and from said tubular member.

17. A self-dampening vessel for encapsulating a fluid comprising:

a tubular member including two generally flattened sides connected by two generally rounded ends;

a generally fixed first height and second height adjacent each of said opposing ends and an adjustable third height generally spaced between each of said opposing ends wherein said first and second heights are generally equal and said third height is generally equal to said first height and said second height in a neutral position; and said flattened sides being an elastic material capable of expanding radially outwardly from a neutral position to an expanded position wherein said third height is greater than said first height and said second height or retracting radially inwardly from said neutral position to a retracted position wherein said third height is less than said first height and said second height.

18. A vessel, as in claim 17, wherein said tubular member further includes at least one opening and at least one cap fixedly attached to said tubular member and covering said at least one opening.

19. A vessel, as in claim 18, wherein said at least one cap further includes a port for transferring fluids to and from said tubular member.

20. A vessel, as in claim 17, wherein said tubular member further includes an outer surface having a port for transferring fluids to and from said tubular member.

21. A self-dampening vessel for encapsulating a fluid comprising:

a tubular member including two generally concave sides connected by two generally rounded ends;

an adjustable first height and second height adjacent each of said rounded ends and an adjustable third height generally spaced between each of said rounded ends wherein said first and second heights are generally equal and said third height is less than said first height and said second height in a neutral position; and said concave sides and rounded ends being an elastic material capable of expanding radially outwardly from said neutral position to an expanded position or retracting radially inwardly from said neutral position to a retracted position in response to pressure changes of the fluid within the vessel, wherein said third height remains less than said first height and said second height in both said expanded position and said retracted position.

22. A vessel, as in claim 21, wherein said tubular member further includes at least one opening and at least one cap fixedly attached to said tubular member and covering said at least one opening.

23. A vessel, as in claim 22, wherein said at least one cap further includes a port for transferring fluids to and from said tubular member.

24. A vessel, as in claim 21, wherein said tubular member further includes an outer surface having a port for transferring fluids to and from said tubular member.

* * * * *

UNITED STATES PATENT AND TRADEMARK OFFICE
CERTIFICATE OF CORRECTION

PATENT NO. : 6,675,657 B1
DATED : January 13, 2004
INVENTOR(S) : Nicholas O. Kaltsounis et al.

It is certified that error appears in the above-identified patent and that said Letters Patent is hereby corrected as shown below:

<u>Title page,</u>
Item [75], Inventor, replace "KalTsounis" with -- Kaltsounis --.

Signed and Sealed this

Eighteenth Day of May, 2004

JON W. DUDAS
*Acting Director of the United States Patent and Trademark Office*